P. Fisher,
Meat Spit,
Nº 70,984. Patented Nov. 19, 1867.
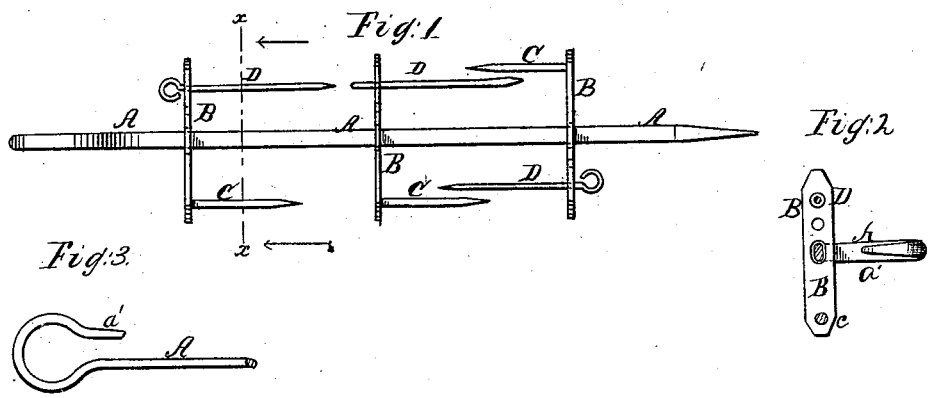
Witnesses
Theo Tusche
J. Alison Fraser
Inventor
Paul Fisher
Per Munn & 
Attorneys

United States Patent Office.

PAUL FISHER, OF WILLIAMSBURG, NEW YORK.

Letters Patent No. 70,984, dated November 19, 1867.

IMPROVED MEAT-SPIT.

*The Schedule referred to in these Letters Patent and making part of the same.*

TO ALL WHOM IT MAY CONCERN:

Be it known that I, PAUL FISHER, of Williamsburg, in the county of Kings, and State of New York, have invented a new and useful improvement in Meat-Spit; and I do hereby declare that the following is a full, clear, and exact description thereof, which will enable others skilled in the art to make and use the same, reference being had to the accompanying drawings, forming part of this specification, in which—

Figure 1 is a side view of a meat-spit, illustrating my improvement.

Figure 2 is a detail sectional view of the same, taken through the line $x\,x$, fig. 1.

Figure 3 is a side view of the handle of the spit.

Similar letters of reference indicate corresponding parts.

My invention has for its object to furnish an improved spit so constructed and arranged as to be more convenient and satisfactory in use than when constructed in the ordinary manner; and it consists in the combination of the skewer-plates and skewers, either stationary or detachable, with the spit, and in the form of the spit-handle, the whole being constructed and arranged as hereinafter more fully described.

A is the spit, the body of which is made oval, and which may be of any device or convenient length. The forward end of the spit A is pointed in the usual manner, and the other end is bent over, as shown in fig. 3, so as to form a convenient handle, and at the same time have a point, $a'$, of suitable form and position, to enter holes in the frame or support to hold the spit and the meat steady in any position into which it may be turned. B are the skewer-plates or bars, which may be made of any convenient form or size, and which have holes through them of the same form as the body of the spit A, so that they may be carried round by the revolution of the said spit, carrying the meat with them. C are skewers, one or more of which may be rigidly attached to the plates B, or separate or detachable skewers D may be used, which may be passed through the holes formed in the plates B for their reception, and forced into the meat, securing it to the said plates and to the spit A. When the detachable skewers D are used, several holes may be formed through the plates B, through one or the other of which the skewer D may be passed, according to the size or character of the article to be attached to the spit.

In using the spit, one of the plates B is placed upon the spit A, provided with stationary or detachable skewers, or with both. The meat to be roasted is then placed upon the spit, and secured to the plate B by the skewers C or D, or both. If desired, another plate, B, and its skewers may then be attached to the other side of the meat, to more securely hold it in place. Any desired number of plates B may be used, and any desired number of articles may be attached to the spit, according to the size and character of the articles to be roasted and the capacity of the spit.

Having thus described my invention, what I claim as new, and desire to secure by Letters Patent, is—

The skewer-plates B provided with the skewer C or D, in combination with the body A of the spit, substantially as described for the purpose specified.

The above specification of my invention signed by me this 8th day of August, 1867.

PAUL FISHER.

Witnesses:
J. ALISON FRASER,
JAMES T. GRAHAM.